Figure 1:
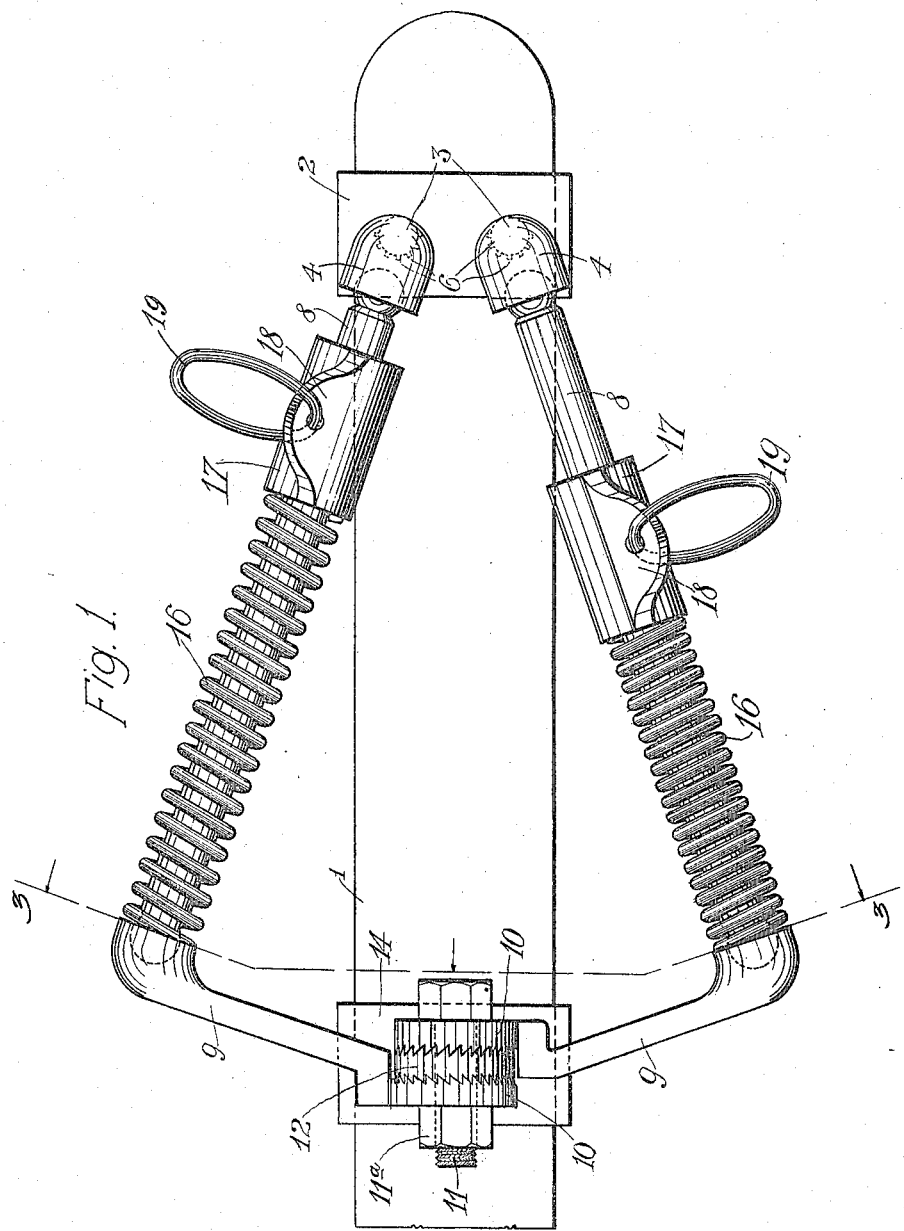

F. W. RIEKE.
ADJUSTABLE SHOCK ABSORBER FOR VEHICLE TONGUES.
APPLICATION FILED JAN. 18, 1915.

1,143,783.

Patented June 22, 1915.
2 SHEETS—SHEET 1.

WITNESSES
Emil Hallenberg
Otto Melchior

INVENTOR.
F. W. Rieke
By H. J. Sanders
ATTY.

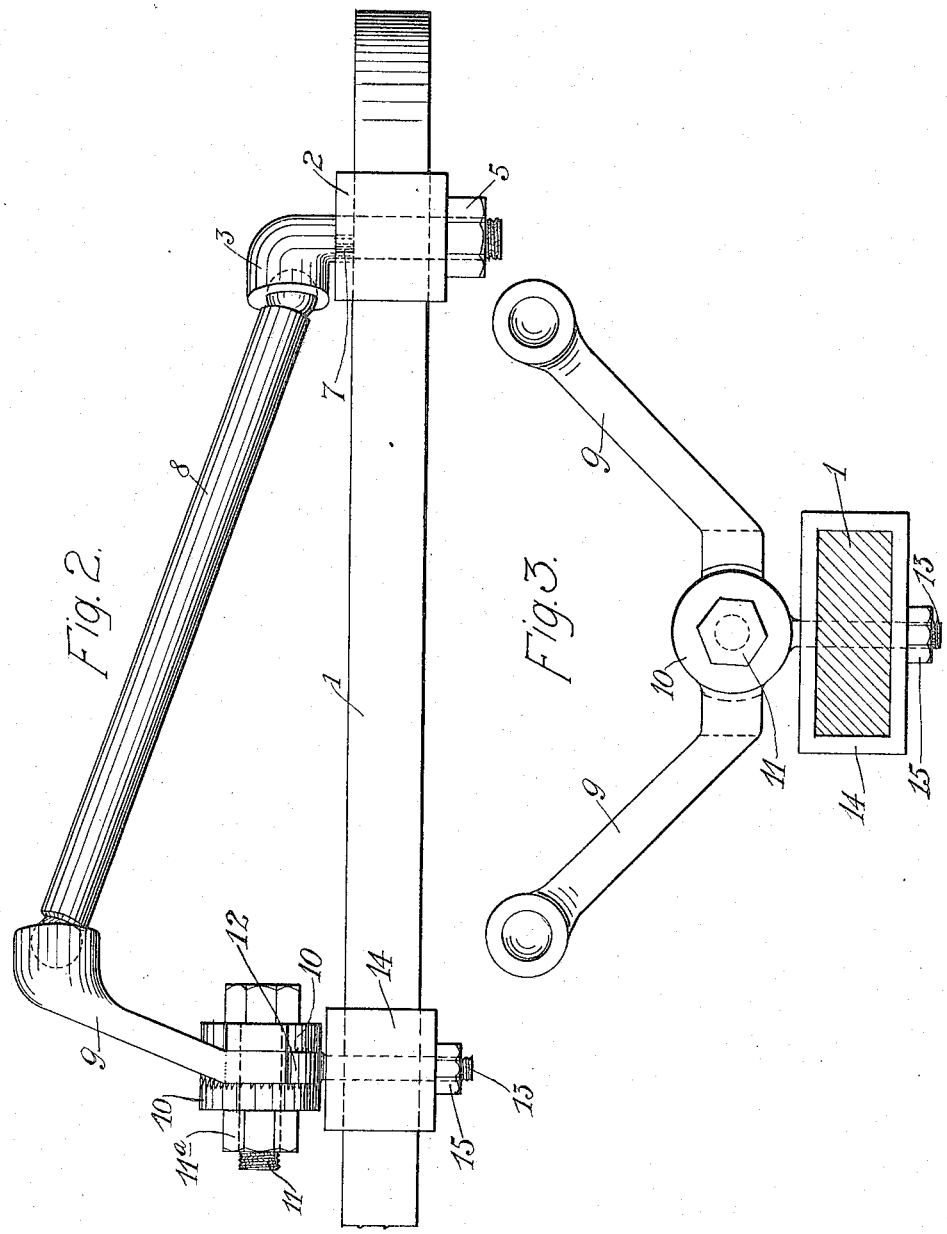

UNITED STATES PATENT OFFICE.

FREDERICK W. RIEKE, OF RED BUD, ILLINOIS.

ADJUSTABLE SHOCK-ABSORBER FOR VEHICLE-TONGUES.

1,143,783. Specification of Letters Patent. Patented June 22, 1915.

Application filed January 18, 1915. Serial No. 2,872.

*To all whom it may concern:*

Be it known that I, FREDERICK W. RIEKE, a citizen of the United States, residing at Red Bud, in the county of Randolph and State of Illinois, have invented certain new and useful Improvements in Adjustable Shock-Absorbers for Vehicle-Tongues, of which the following is a specification.

This invention relates to improvements in adjustable shock absorbers for vehicle tongues and its object is to produce a device that may be applied to the tongue of any vehicle to take the shock incident to travel over rough roads which would otherwise be transmitted to the horses' collars and so constantly cause an annoying jerking upon the neck of the animals. The construction of the invention is such that it may be adjusted to draft animals of different sizes; and also adjusted to suit the working peculiarities of the animals, as some animals may work close to the tongue of the vehicle and others at a relatively great distance therefrom.

The invention consists in the combination and arrangement of parts to be hereinafter fully described in the following specification, pointed out in the claims and illustrated in the accompanying drawings which form a part of said specification and in which—

Figure 1 is a plan view of my shock absorbers attached to the tongue of a vehicle. Fig. 2 is a side elevation of the same with spring and block removed. Fig. 3 is a cross section taken on line 3—3 of Fig. 1.

Like reference characters indicate corresponding parts throughout the several views.

The reference character 1 designates the tongue of a vehicle to one end of which a band 2 is secured and said band is formed with openings 3, 3 to admit the adjusting bolts 4, 4 which are provided with the adjusting nuts 5. The openings in one lateral face of the band are formed with spur grooves 6, which are adapted to receive the burs 7 formed upon the bolts 4 to retain said bolts releasably in adjusted position. To adjust one of the bolts with relation to the band 2 the adjusting nut is loosened so that the bolt may be raised out of the band and turned in a position to cause its bur 7 to slide into engagement with any one of the spur grooves desired as the bolt is re-inserted in said band; the adjusting nut is now again placed in position and the bolt retained in adjusted position.

Each adjusting bolt 4 carries one end of a pitman 8, to which it is connected by ball and socket joint, the other end of said pitman being connected in a similar manner to an adjusting arm 9 which terminates in an annular toothed member 10 disposed upon a bolt 11 provided with a nut 11ª for releasable engagement with an annular rack 12, also carried by bolt 11; said rack 12 being formed integral with a bolt 13, which extends through another band 14, disposed about the tongue, and through the tongue and which is provided with the adjusting nut 15. Upon each pitman a spring 16 is disposed which serves as a shock absorber and which abuts one of the adjusting arms 9 at one extremity and a sliding block 17 at the opposite extremity; said block being formed with a tongue 18 that carries a draft ring 19 that is connected by part of the harness to the horse collar.

If one draft animal is taller than the other the pitman to which he is connected may be adjusted to suit his size and also to suit his manner of working. I have previously described how the bolts 4 may be adjusted with relation to the band 2. The arms 9 may be adjusted with relation to the rack 12 by first loosening the nut 11ª of bolt 11 to permit the toothed members 10 to be drawn away from said rack and then turned as desired and again placed in engagement with said rack and locked. The adjustments described permit the pitmen to be raised or lowered with respect to the tongue. The jerks given the tongue by the travel of the vehicle are absorbed by the springs 16 and do not reach the animals.

What is claimed is:—

1. The combination with a vehicle tongue, of a pair of bands, a pair of bolts adjustably secured to one of said bands, a rack secured to the other band and to the tongue, angular arms, annular racks formed integral with said arms for adjustable engagement with the first named rack, pitmen connecting said arms and the aforesaid bolts and shock absorbing means carried by said pitmen.

2. The combination with a vehicle tongue, of a pair of bands, a pair of bolts adjustably secured to one of said bands, a rack secured to the other band and to the tongue, angular arms, annular racks formed integral with said arms for adjustable engagement with the first named rack, pitmen connecting said arms and the aforesaid bolts, sliding blocks disposed upon said pitmen and springs disposed about said pitmen and terminally abutting said sliding blocks.

3. The combination with a vehicle tongue, of a pair of apertured bands, the apertures in one face of one of said bands being formed with spur grooves, a pair of bolts adapted for releasable engagement with one of said apertured bands, spurs formed upon said bolts for releasable engagement with the spur grooved portions of said bands, a rack secured to the other band and to the tongue, angular arms, annular racks formed integral with said arms for adjustable engagement with the first named rack, pitmen connecting said arms and the aforesaid bolts and shock absorbing means carried by said pitmen.

In testimony that I claim the foregoing as my own I have hereto affixed my signature in the presence of two subscribing witnesses.

FRED. W. RIEKE.

Witnesses:
THEO. SAXENMEYER,
ARNOLD SCHUETTE.

Copies of this patent may be obtained for five cents each, by addressing the "Commissioner of Patents, Washington, D. C."